United States Patent
Kim et al.

(10) Patent No.: US 8,005,036 B2
(45) Date of Patent: Aug. 23, 2011

(54) APPARATUS AND METHOD FOR SCHEDULING FOR COLLABORATIVE SPATIAL MULTIPLEXING IN A BROADBAND WIRELESS COMMUNICATION SYSTEM

(75) Inventors: Yong-Seok Kim, Suwon-si (KR); June Moon, Seoul (KR); Si-Hyun Park, Hwaseong-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 875 days.

(21) Appl. No.: 12/023,548

(22) Filed: Jan. 31, 2008

(65) Prior Publication Data

US 2008/0186915 A1  Aug. 7, 2008

(30) Foreign Application Priority Data

Feb. 1, 2007  (KR) .................. 10-2007-0010611

(51) Int. Cl.
*H04B 7/216* (2006.01)
(52) U.S. Cl. ........................................... 370/320
(58) Field of Classification Search .......... None
See application file for complete search history.

(56) References Cited

U.S. PATENT DOCUMENTS 6,240,098 B1 * 5/2001 Thibault et al. ............... 370/431
6,366,601 B1 4/2002 Ghosh et al.
7,599,698 B2 * 10/2009 Cheng et al. ............... 455/452.2
2007/0064641 A1 * 3/2007 Laroia et al. .................. 370/320
2007/0087756 A1 * 4/2007 Hoffberg ...................... 455/450

FOREIGN PATENT DOCUMENTS

KR  10-2007-0054080 A  5/2007
KR  10-2007-0072983 A  7/2007
KR  10-2008-0072193 A  8/2008

* cited by examiner

Primary Examiner — Raj K Jain
(74) Attorney, Agent, or Firm — Jefferson IP Law, LLP (57) ABSTRACT

Provided is an apparatus and method for scheduling for collaborative spatial multiplexing in a broadband wireless communication system. An apparatus for a base station for supporting collaborative spatial multiplexing in a broadband wireless communication system includes a controller, an estimator, and a determiner. The controller selects a second mobile station with the best channel quality among non-scheduled mobile stations. The estimator estimates a load and transmitting (TX) power of the second mobile station. The determiner is used to adjust a modulation and coding scheme (MCS) level of the second mobile station so that a total load of first and second mobile stations when coupled does not exceed a first threshold value and also the power of the second mobile station does not exceed a second threshold value.

18 Claims, 7 Drawing Sheets

APPARATUS AND METHOD FOR SCHEDULING FOR COLLABORATIVE SPATIAL MULTIPLEXING IN A BROADBAND WIRELESS COMMUNICATION SYSTEM

PRIORITY

This application claims the benefit under 35 U.S.C. §119(a) to an Korean application filed in the Korean Intellectual Property Office on Feb. 1, 2007 and assigned Serial No. 2007-10611, the entire disclosure of which is hereby incorporated by reference.

BACKGROUND OF THE INVENTION

1. Field of the Invention

The present invention relates to a broadband wireless communication system. More particularly, the present invention relates to an apparatus and method for scheduling for collaborative spatial multiplexing (CSM) in a broadband wireless communication system.

2. Description of the Related Art

It is important to efficiently use limited radio resources in a wireless communication system. A multi-input multi-output (MIMO) scheme is one scheme for efficiently using the limited radio resources. The MIMO scheme spatially divides communication channels using a plurality of transmitting (TX) antennas and receiving (RX) antennas. Because a MIMO communication system transmits/receives different signals by spatially dividing channels of N antennas while using the same time resource and the same frequency resource, it can provide up to N times the channel capacity gain of a single-antenna system.

A collaborative spatial multiplexing (CSM) scheme has been proposed as an application of the MIMO scheme. The CSM scheme constructs a virtual MIMO environment for uplink communication by treating a plurality of mobile stations (MSs) as one MS using a plurality of antennas. That is, when a plurality of MSs simultaneously transmit signals to a base station (BS) with a plurality of RX antennas through the same resource region, the BS detects the signals from the respective MSs according to the MIMO scheme.

Figure 1:
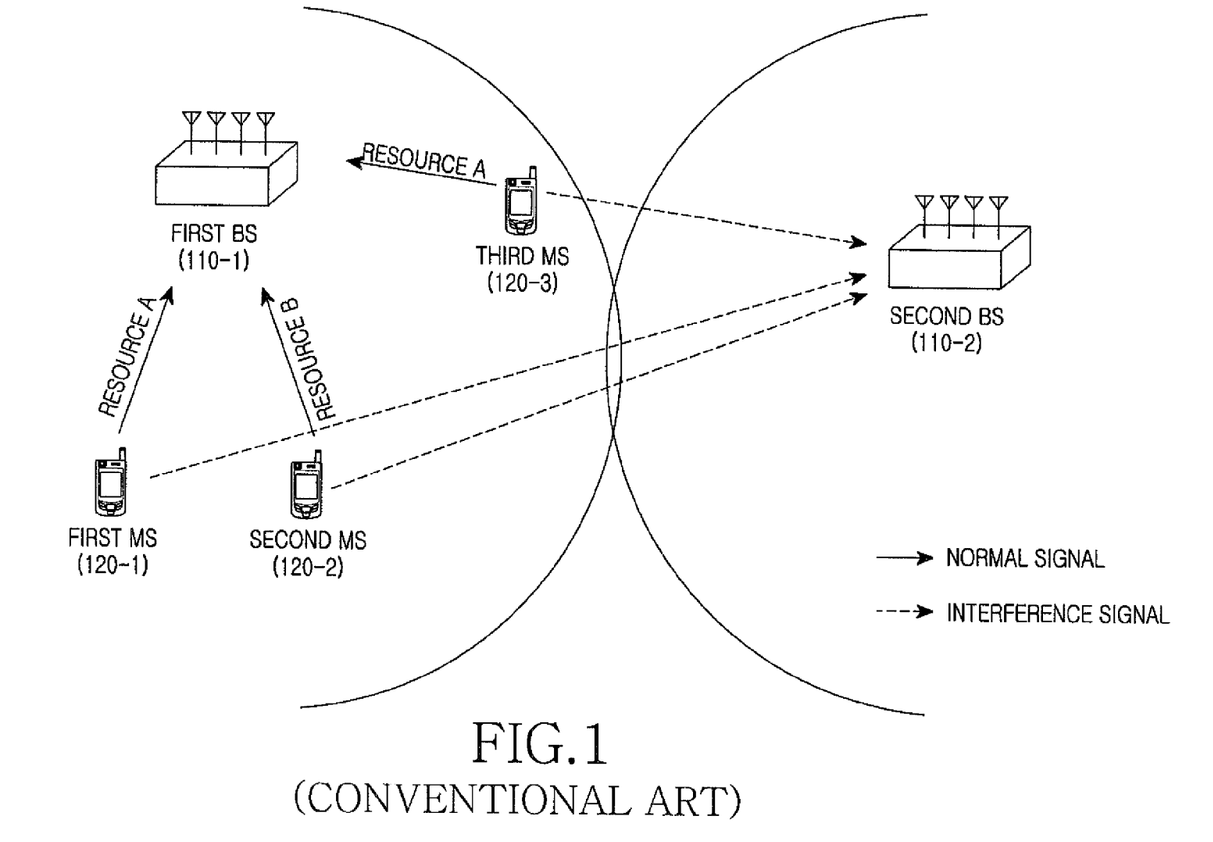
FIG. 1 illustrates base stations (BSs) and mobile stations (MSs) that perform communications in a broadband wireless communication system by using a collaborative spatial multiplexing (CSM) scheme.

FIG. 1 illustrates BSs and MSs that perform communications in a broadband wireless communication system by using a CSM scheme.

Referring to FIG. 1, a first BS 110-1 performs uplink communication with a first MS 120-1, a second MS 120-2, and a third MS 120-3. The first MS 120-1 and the third MS 120-3 transmit signals by both using a resource A, while the second MS 120-2 transmits a signal by using resource B. That is, the first MS 120-1 and the third MS 120-3 perform uplink communications by using the CSM scheme.

The signal transmitted from the MSs 120-1 and 120-3 to the first BS 110-1 acts as an interference signal to a second BS 110-2 of a neighboring cell. Because the second MS 120-2 monopolizes resource B, the signal transmitted from the second MS 120-2 does not act as a strong interference against the second BS 110-2. However, because the MSs 120-1 and 120-3 both use resource A, the sum of the signals transmitted from the MSs 120-1 and 120-3 acts as a strong interference to the second BS 110-2.

Therefore, a need exits for a scheme for reducing the interference resulting from the CSM scheme.

SUMMARY OF THE INVENTION

An aspect of the present invention is to address at least the above-mentioned problems and/or disadvantages and to provide at least the advantages described below. Accordingly, an aspect of the present invention is to provide an apparatus and method for scheduling for use of a collaborative spatial multiplexing (CSM) scheme in a broadband wireless communication system.

Another aspect of the present invention is to provide an apparatus and method for scheduling for a CSM scheme in a broadband wireless communication system in consideration of the signal power and the load for duplicately allocated resources.

Still another aspect of the present invention is to provide an apparatus and method for scheduling for a CSM scheme in a broadband wireless communication system in consideration of a hybrid automatic repeat-request (HARQ) scheme.

According to one aspect of the present invention, an apparatus for a base station (BS) in a broadband wireless communication system supporting a CSM scheme includes a controller for selecting a second mobile station (MS) with the best channel quality among non-scheduled MSs to couple the selected second MS with a scheduled first MS, an estimator for estimating a load and transmitting (TX) power of the second MS, and a determiner for adjusting a modulation and coding scheme (MCS) level of the second MS so that a total load of the first and second MSs when coupled does not exceed a first threshold value and also the power of the second MS does not exceed a second threshold value.

According to another aspect of the present invention, an apparatus for a BS in a broadband wireless communication system supporting a CSM scheme includes a controller for, if there is an error in all packets received from coupled MSs through the CSM scheme, again coupling the coupled MSs using the same resource as in the previous scheduling for packet retransmission according to an HARQ scheme, and a determiner for applying the same MCS level as the previous scheduling to the MSs.

According to still another aspect of the present invention, a method for scheduling by a BS in a broadband wireless communication system supporting a CSM scheme includes selecting a second MS with the best channel quality among non-scheduled MSs to couple the selected second MS with a scheduled first MS, estimating a load and TX power of the second MS, and adjusting an MCS level of the second MS so that the total load of the first and second MSs when coupled does not exceed a first threshold value and also the power of the second MS does not exceed a second threshold value.

According to even another aspect of the present invention, a method for scheduling by a BS in a broadband wireless communication system supporting a CSM scheme includes if there is an error in all packets received from coupled MSs through the CSM scheme, again coupling the coupled MSs using the same resource as in the previous scheduling for packet retransmission according to an HARQ scheme, and applying the same MCS level as the previous scheduling to the MSs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will become more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness Exemplary embodiments of the present invention are intended to provide a scheduling technique for use of a collaborative spatial multiplexing (CSM) scheme in a broadband wireless communication system.

In the following description, a mobile station (MS) performing communication by monopolizing a resource without using a CSM scheme will be referred to as 'non-CSM MS', a mobile station primarily allocated a resource by using the CSM scheme will be referred to as 'primary-CSM MS', and a mobile station secondarily allocated the resource by using the CSM scheme will be referred to as 'secondary-CSM MS'. Also, allocating the same resource to a plurality of MSs by using the CSM scheme will be referred to as a 'coupling'.

Figure 2:
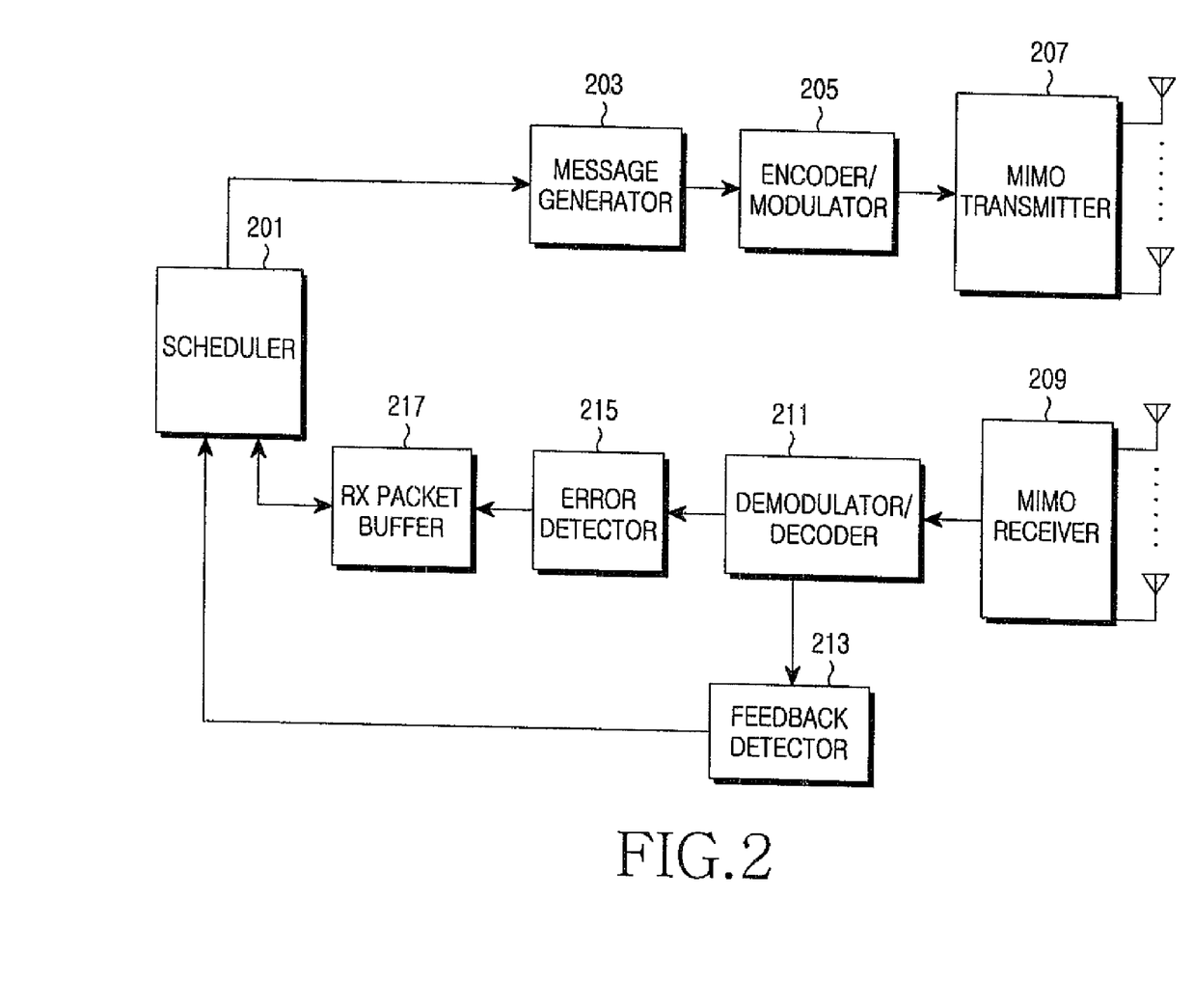
FIG. 2 is a block diagram of a BS in a broadband wireless communication system according to an exemplary embodiment of the present invention.

FIG. 2 is a block diagram of a base station (BS) in a broadband wireless communication system according to an exemplary embodiment of the present invention.

Referring to FIG. 2, the BS includes a scheduler 201, a message generator 203, an encoder/modulator 205, a multi-input multi-output (MIMO) transmitter 207, a MIMO receiver 209, a demodulator/decoder 211, a feedback detector 213, an error detector 215, and a receiving (RX) packet buffer 217.

The scheduler 201 performs radio resource scheduling to allocate radio resources to MSs. In particular, according to an exemplary embodiment of the present invention, the scheduler 201 performs scheduling for a CSM scheme during uplink scheduling. That is, the scheduler 201 allocates the same resources to a plurality of MSs in order to perform communication based on the CSM scheme. The detailed construction and function of the scheduler 201 will be described later with reference to FIG. 3.

The message generator 203 generates a control message for controlling MSs. For example, the message generator 203 generates a MAP message for reporting the scheduling results of the scheduler 201. Also, the message generator 203 generates an ACKnowledgement (ACK) message or a Negative ACKnowledgement (NACK) message depending on whether or not there is an error in a received packet. The encoder/modulator 205 encodes and modulates a bit sequence into complex symbols.

The MIMO transmitter 207 transmits the complex symbols received from the encoder/modulator 205 through a plurality of transmitting (TX) antennas. For example, the MIMO transmitter 207 processes and transmits signals in accordance with a spatial multiplexing (SM) scheme or a space-time coding (STC) scheme. If the BS belongs to an orthogonal frequency division multiplexing (OFDM) system, the MIMO transmitter 207 includes a mapper for mapping signals to subcarriers, an OFDM modulator for converting the signals received from the mapper into OFDM symbols by inverse fast Fourier transform (IFFT), and a radio frequency (RF) processor for converting the OFDM symbols received from the OFDM modulator into RF signals prior to transmission through the antennas.

The MIMO receiver 209 receives signals through a plurality of RX antennas and detects the received signals for respective streams. The demodulator/decoder 211 demodulates and decodes complex symbols received from the MIMO receiver 209 into a bit sequence. Also, the demodulator/decoder 211 outputs a data bit sequence to the error detector 215 and outputs feedback data to the feedback detector 213. The feedback detector 213 detects a downlink channel quality for each MS using control information that is fed back from the MS. Examples of channel quality information include a signal-to-noise ratio (SNR), a signal-to-interference and noise ratio (SINR), and a carrier-to-interference and noise ratio (CINR).

The error detector 215 classifies the bit sequence received from the demodulator/decoder 211 into units of packets, and detects whether each packet has been successfully received. That is, the error detector 215 performs a cyclic redundancy check (CRC) to detect whether there is an error in the packet.

The RX packer buffer 217 temporarily stores the received packet. In particular, the RX packet buffer 217 stores one or more packets having an error. For example, the RX packet buffer 217 stores the packets having an error in order to perform packet combination by a hybrid automatic repeat request (HARQ) scheme after reception of a retransmitted packet. At this point, according to an exemplary embodiment of the present invention, the RX packet buffer 217 classifies the packets with an error prior to storage. For example, the RX packet buffer 217 classifies the packets with an error into non-CSM MS packets, primary-CSM MS packets, and secondary-CSM MS packets prior to storage.

Figure 3:
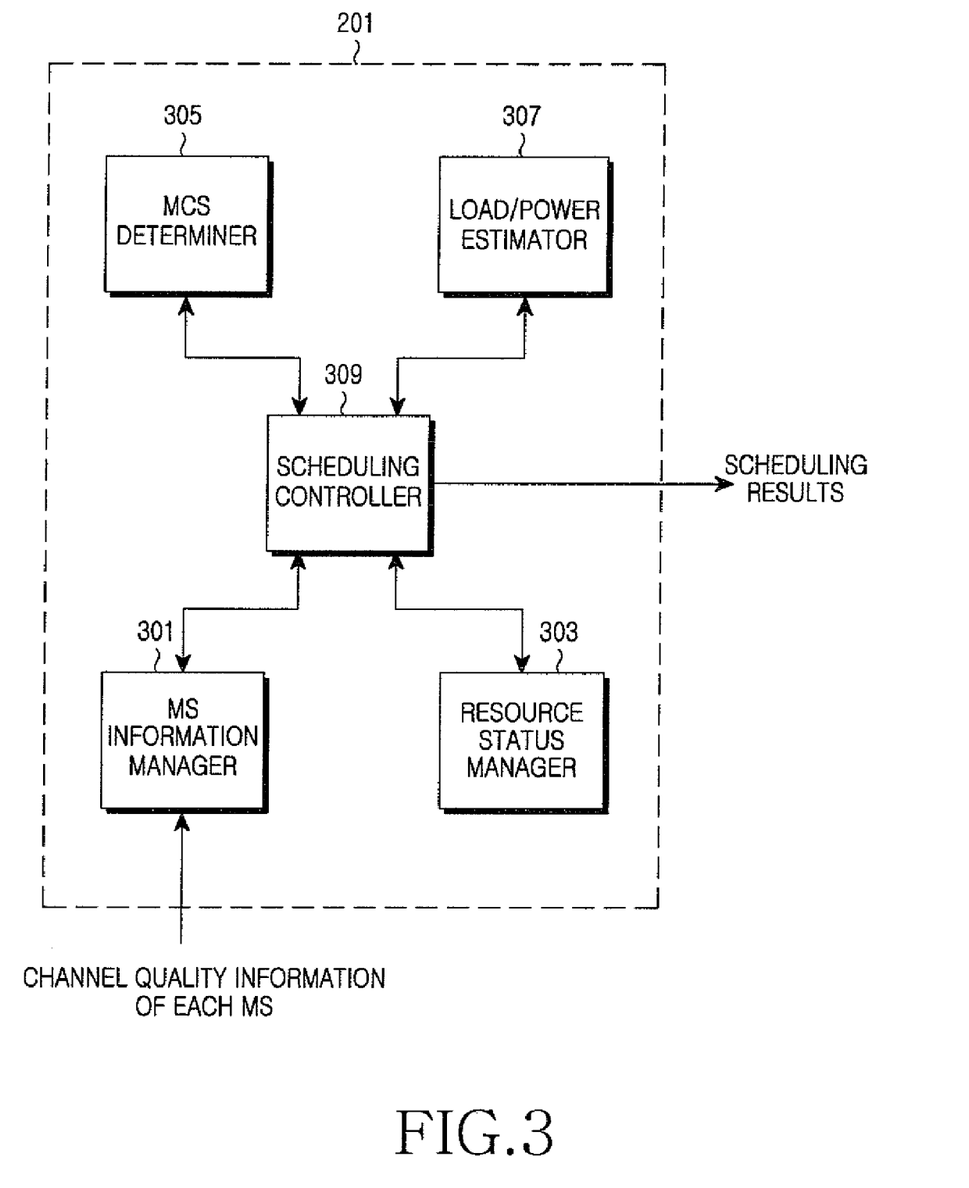
FIG. 3 is a block diagram of a scheduler in a broadband wireless communication system according to an exemplary embodiment of the present invention.

FIG. 3 is a block diagram of the scheduler 201 of the BS in the broadband wireless communication system according to an exemplary embodiment of the present invention.

Referring to FIG. 3, the scheduler 201 includes a MS information manager 301, a resource status manager 303, a modulation and coding scheme (MCS) determiner 305, a load/power estimator 307, and a scheduling controller 309.

The MS information manager 301 stores and retains channel quality information of each MS. The resource status manager 303 stores and retains resource allocation status information. Examples of the resource allocation status information include information about to which MS a resource of a predetermined region has been allocated, information about whether the resource has been allocated to one MS or to a plurality of MSs, and information about the amount of schedulable resources.

The MCS determiner 305 determines an MCS level for the MS on the basis of the MS channel quality information stored in the MS information manager 301. Also, the MCS determiner 305 adjusts the determined MCS level under the control of the scheduling controller 309.

The load/power estimator 307 calculates the load and power of the MS on the basis of the MS MCS level determined by the MCS determiner 305 and the MS channel quality information stored in the MS information manager 301. For example, the load/power estimator 307 calculates the load and power of MSs using a predetermined resource region in order to detect whether the load of the predetermined resource region exceeds a threshold value when a scheduling operation is performed under the control of the scheduling controller 309. For example, the MS power can be calculated as Equation (1):

$$\hat{P}_n(k) = P_n(k-i) - reqCINR(MCS_n(k-i)) + reqCINR(MCS_n(k)) - 10\log 10(Nsch_n(k-i)) + 10\log 10(Nsch_n(k)) - NI(k-i) + NI(k) \quad (1)$$

where $\hat{P}_n(k)$ denotes the estimated power of the $n^{th}$ MS in the $k^{th}$ frame, $P_n(k-i)$ denotes the TX power of the $n^{th}$ MS in the $(k-i)^{th}$, reqCINR($MCS_n(k)$) denotes a required SINR for the MCS level of the $n^{th}$ MS in the $k^{th}$ frame, $Nsch_n(k)$ denotes the amount of resource allocated to the $n^{th}$ MS in the $k^{th}$ frame, and NI(k) denotes a noise and interference in the $k^{th}$ frame, which may be an average or instantaneous value. Herein, the $k^{th}$ frame is the current scheduling frame and the $(k-i)^{th}$ frame is the last communication frame of the $n^{th}$ MS. Also, the unit of the parameters in Equation (1) is dB.

For example, the MS load can be calculated as Equation (2):

$$\hat{L}_n(k) = reqCINR(MCS_n(k)) + 10\log 10(Nsch_n(k)) + NI - CQI_n(k) \quad (2)$$

where $\hat{L}_n(k)$ denotes the estimated load of the $n^{th}$ MS in the $k^{th}$ frame, reqCINR($MCS_n(k)$) denotes a required SINR for the MCS level of the $n^{th}$ MS in the $k^{th}$ frame, $Nsch_n(k)$ denotes the amount of resource allocated to the $n^{th}$ MS in the $k^{th}$ frame, NI denotes a noise and interference, which may be an average or instantaneous value, and $CQI_n(k)$ denotes the downlink channel quality of the $n^{th}$ MS fed back in the $k^{th}$ frame. Herein, the unit of the parameters in Equation (2) is dB.

Also, the load/power estimator 307 calculates the total system load ($L_{sys}$) under the control of the scheduling controller 309. Herein, the total system load means the sum of the loads of the respective MSs.

The scheduling controller 309 performs scheduling by controlling the MS information manager 301, the resource status manager 303, the MCS determiner 305, and the load/power estimator 309. In particular, according to an exemplary embodiment of the present invention, the scheduling controller 309 performs scheduling for a CSM operation. Herein, the scheduling controller 309 performs scheduling in such a way that the sum of the loads of two MSs allocated the same resource does not exceed a threshold value. For example, for the $n^{th}$ and $j^{th}$ MSs, the scheduling controller 309 performs scheduling in such a way that that a collaborative load, calculated as Equation (3) below, does not exceed a threshold value.

$$\hat{L}_{CSM(n,j)}(k) = \hat{L}_n(k) + \hat{L}_j(k) \quad (3)$$

where $\hat{L}_{CSM(n,j)}(k)$ denotes a collaborative load corresponding to the sum of the loads of the $n^{th}$ and $j^{th}$ MSs in the $k^{th}$ frame, $\hat{L}_n(k)$ denotes the load of the $n^{th}$ MS in the $k^{th}$ frame, and $\hat{L}_j(k)$ denotes the load of the $j^{th}$ MS in the $k^{th}$ frame. Herein, the load of each MS is calculated as Equation (2) above.

Also, the scheduling controller 309 performs scheduling in such a way that the power of the secondary-CSM MS does not exceed a threshold value. That is, the scheduling controller 309 controls the adjustment of the MCS level of the secondary-CSM MS to perform scheduling in such a way that the collaborative load and the power of the secondary-CSM MS do not exceed the respective threshold values. Simultaneously, the scheduling controller 309 performs scheduling in such a way that the total system load ($L_{sys}$) does not exceed a predetermined value.

In one embodiment, in order not to affect general scheduling and priority, the scheduling controller 309 may perform primary scheduling without duplicate allocations for all resources and may perform secondary scheduling in accordance with the CSM scheme. In another embodiment, in order to achieve a high data transmission rate, the scheduling controller 309 may perform scheduling in accordance with the CSM scheme from the initial scheduling state. However, the scheduling procedures of the two embodiments must satisfy the above-described load/power conditions. The scheduling procedures of the two embodiments will be described later in detail with reference to FIGS. 4 and 5.

In the case of the use of an HARQ scheme, the scheduling controller 309 performs scheduling in consideration of MSs that require retransmission. If there are errors in all of the packets of coupled MSs, that is, MSs using the same resource in accordance with the CSM scheme, the scheduling controller 309 couples the MSs using the same resources at the same MCS level as before. In this case, if a high priority is given to the MSs requiring retransmission, the scheduling controller 309 detects the error packets stored in the RX packet buffer 217 and preferentially allocates resources to the MSs requiring retransmission. A scheduling procedure for the MSs requiring retransmission will be described later in detail with reference to FIGS. 6 and 7.

Figure 4:
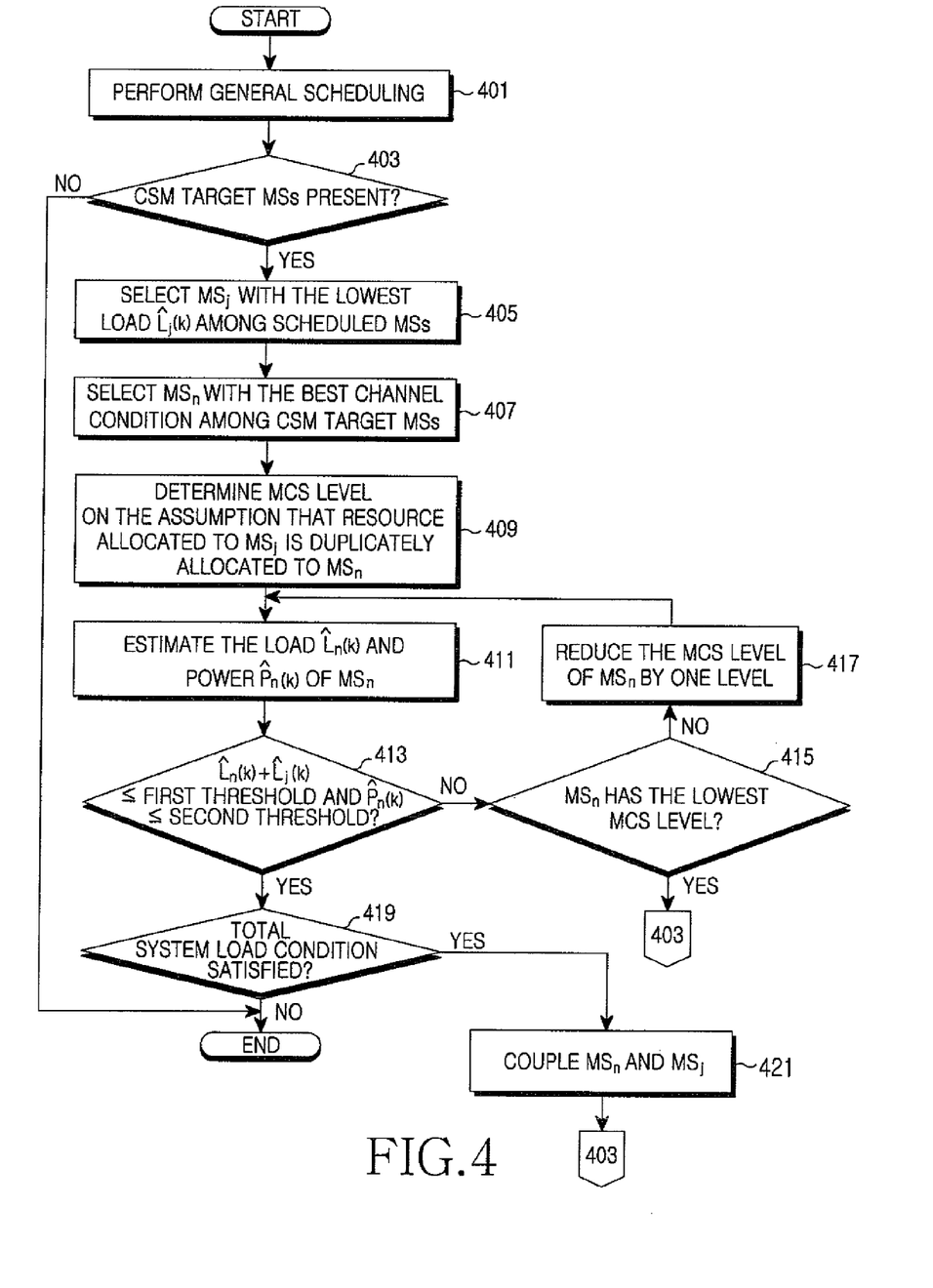
FIG. 4 is a flowchart of a scheduling procedure for a BS in a broadband wireless communication system according to a first exemplary embodiment the present invention.

FIG. 4 is a flowchart illustrating a scheduling procedure of the BS in the broadband wireless communication system according to a first exemplary embodiment the present invention. FIG. 4 illustrates a procedure for performing primary scheduling without consideration of the CSM scheme (i.e., without duplicate allocation of all resources to MSs) and for performing secondary scheduling in accordance with the CSM scheme.

Referring to FIG. 4, the BS performs general scheduling in step 401. That is, the BS allocates resources to MSs according to scheduling priority without duplicate allocation. During the scheduling in step 401, adjustments are made to the load and power of each MS.

In step 403, the BS determines whether CSM target MSs are present. Herein, whether CSM target MSs are present may be determined by the BS or at the request of the corresponding MS, depending on the distribution of MSs in a cell. If the CSM target MSs are not present (in step 403), the BS ends the scheduling procedure.

If the CSM target MSs are present (in step 403), the scheduling procedure proceeds to step 405. In step 405, among the previously scheduled MSs, the BS selects the first MS ($MS_j$) with the lowest load $\hat{L}_j(k)$ as a primary-CSM MS.

In step 407, among the CSM target MSs, the BS selects the second MS ($MS_n$) with the best channel condition as a secondary-CSM MS.

In step 409, on the basis of the channel condition of the second MS, the BS determines an MCS level for the second MS on the assumption that a resource allocated to the first MS is duplicately allocated to the second MS.

In step 411, the BS estimates the load $\hat{L}_n(k)$ and power $\hat{P}_n(k)$ of the second MS. For example, the BS's estimated load $\hat{L}_n(k)$ and power $\hat{P}_n(k)$ of the second MS are calculated according to Equation (1) and Equation (2).

In step 413, the BS determines whether a collaborative load $\hat{L}_{CSM(n,j)}(k)$ (which is equal to the sum of the load $\hat{L}_j(k)$ of the first MS and the load $\hat{L}_n(k)$ of the second MS) is smaller than or equal to a first threshold value and whether the power $\hat{P}_n(k)$ of the second MS is smaller than or equal to a second threshold value. It is noted that the first threshold value and second threshold value may be the same threshold value.

If any one of the two conditions is not satisfied (in step 413), that is, if the collaborative load $\hat{L}_{CSM(n,j)}(k)$ is greater than the first threshold value or if the power $\hat{P}_n(k)$ of the second MS is greater than the second threshold value, the scheduling procedure proceeds to step 415. In step 415, the BS determines whether the MCS level of the second MS is the lowest MCS level.

If the MCS level of the second MS is the lowest MCS level (in step 415), the BS excludes the second MS selected in step 407 from the CSM target (i.e., cancels the coupling of the first MS and the second MS) and returns to step 403.

On the other hand, if the MCS level of the second MS is not the lowest MCS level (in step 415), the BS reduces the MCS level of the second MS by one level in step 417 and returns to step 411. That is, the BS repeats steps 415, 417 and 411 to adjust the MCS level of the second MS until both of the two conditions in step 413 are satisfied.

On the other hand, if both of the two conditions are satisfied (in step 413), the scheduling procedure proceeds to step 419. In step 419, the BS determines whether the condition for the total system load ($L_{sys}$) is satisfied when the second MS uses the adjusted MCS level.

If the condition for the total system load ($L_{sys}$) is not satisfied (in step 419), the BS ends the scheduling procedure without coupling the first MS and the second MS.

On the other hand, if the condition for the total system load ($L_{sys}$) is satisfied (in step 419), the BS couples the first MS and the second MS in step 421 and returns to step 403 in order to perform a new coupling process.

Figure 5:
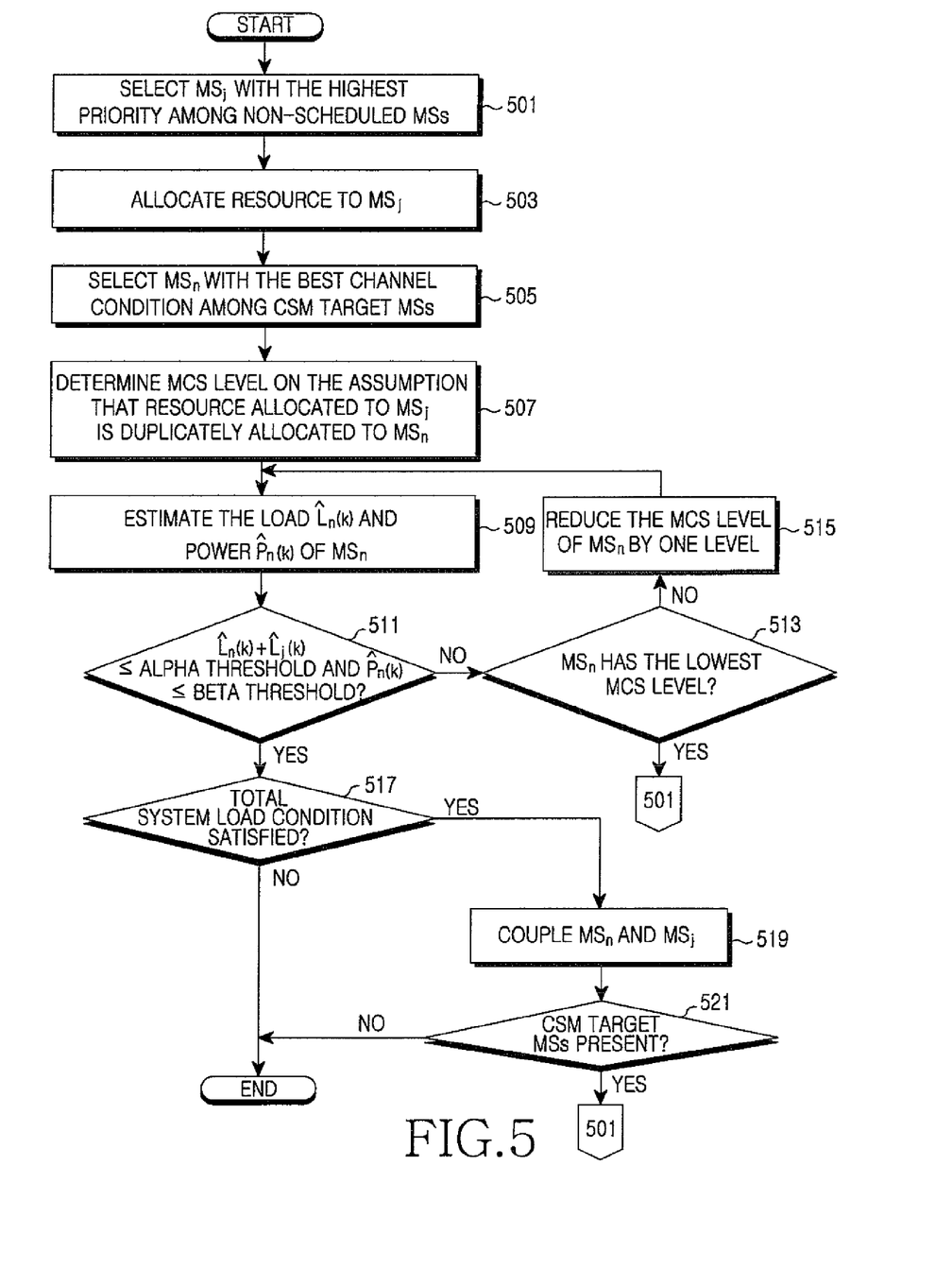
FIG. 5 is a flowchart of a scheduling procedure for a BS in a broadband wireless communication system according to a second exemplary embodiment the present invention.

FIG. 5 is a flowchart illustrating a scheduling procedure of the BS in the broadband wireless communication system according to a second exemplary embodiment the present invention. FIG. 5 illustrates a scheduling procedure for performing scheduling in accordance with the CSM scheme from the initial scheduling stage in order to achieve a high data transmission rate.

Referring to FIG. 5, among the non-scheduled MSs, the BS selects the first MS ($MS_j$) with the highest priority as a primary-CSM MS in step 501.

In step 503, the BS allocates a resource to the first MS. That is, on the basis of the channel condition of the first MS, the BS allocates a resource to the first MS and determines the MCS level of the first MS so that a threshold value of the load is not exceeded.

In step 505, among CSM target MSs, the BS selects the second MS ($MS_n$) with the best channel condition as a secondary-CSM MS.

In step 507, on the basis of the channel quality of the second MS, the BS determines an MCS level for the second MS on the assumption that a resource allocated to the first MS is duplicately allocated to the second MS.

In step 509, the BS estimates the load $\hat{L}_n(k)$ and power $\hat{P}_n(k)$ of the second MS. For example, the BS's estimated load $\hat{L}_n(k)$ and power $\hat{P}_n(k)$ of the second MS are calculated according Equation (1) and Equation (2).

In step 511, the BS determines whether a collaborative load $\hat{L}_{CSM(n,j)}(k)$ (which is equal to the sum of the load $\hat{L}_j(k)$ of the first MS and the load $\hat{L}_n(k)$ of the second MS) is smaller than or equal to an alpha threshold value and whether the power $\hat{P}_n(k)$ of the second MS is smaller than or equal to a beta threshold value. It is noted that the alpha threshold value and beta threshold value may be the same threshold value.

If any one of the two conditions is not satisfied (in step 511), that is, if the collaborative load $\hat{L}_{CSM(n,j)}(k)$ is greater than the alpha threshold value or if the power $\hat{P}_n(k)$ of the second MS is greater than the beta threshold value, the scheduling procedure proceeds to step 513. In step 513, the BS determines whether the MCS level of the second MS is the lowest MCS level.

If the MCS level of the second MS is the lowest MCS level (in step 513), the BS excludes the second MS selected in step 407 from the CSM target (i.e., cancels the coupling of the first MS and the second MS) and returns to step 501.

On the other hand, if the MCS level of the second MS is not the lowest MCS level (in step 513), the BS reduces the MCS level of the second MS by one level in step 515 and returns to step 509. That is, the BS repeats steps 513, 515 and 509 to adjust the MCS level of the second MS until both of the two conditions in step 511 are satisfied.

On the other hand, if both of the two conditions are satisfied (in step 511), the scheduling procedure proceeds to step 517. In step 517, the BS determines whether the condition for the total system load ($L_{sys}$) is satisfied when the second MS uses the adjusted MCS level.

If the condition for the total system load ($L_{sys}$) is not satisfied (in step 517), the BS ends the scheduling procedure without coupling the first MS and the second MS, i.e., without allocating the resource duplicately according to the CSM scheme.

On the other hand, if the condition for the total system load ($L_{sys}$) is satisfied (in step 517), the BS couples the first MS and the second MS in step 519 and proceeds to step 521.

In step 521, the BS determines whether non-scheduled resources are present. If the non-scheduled resources are present (in step 521), the scheduling procedure returns to step 501. On the other hand, if the non-scheduled resources are not present (in step 521), the BS ends the scheduling procedure.

Hereinafter, a description will be given of a scheduling procedure that considers MSs requiring retransmission by the HARQ scheme. In the following description, a first buffer, a second buffer, and a third buffer are buffers for storing retransmission packets that require retransmission because they have an error. Herein, the first buffer stores at least one packet of a non-CSM MS, the second buffer stores at least one packet of a primary-CSM MS, and the third buffer stores at least one packet of a secondary-CSM MS.

Figure 6:
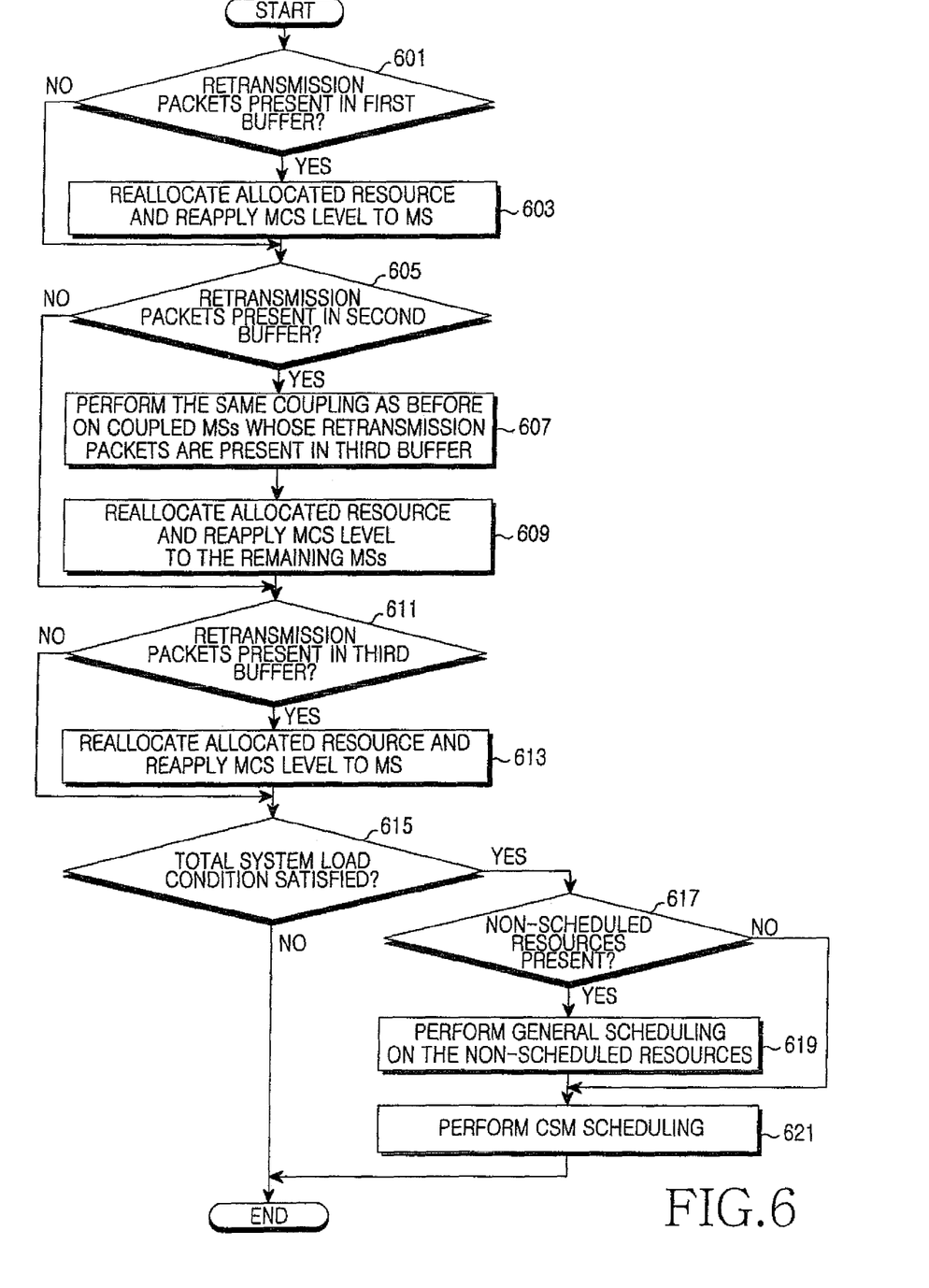
FIG. 6 is a flowchart of a scheduling procedure for a BS in a broadband wireless communication system according to a third exemplary embodiment the present invention.

FIG. 6 is a flowchart illustrating a scheduling procedure of the BS in the broadband wireless communication system according to a third exemplary embodiment the present invention. FIG. 6 illustrates a scheduling procedure when a high priority is given to the MSs requiring retransmission.

Referring to FIG. 6, in step 601, the BS determines whether one or more retransmission packets are present in the first buffer. That is, the BS determines whether MSs requiring retransmission are present among non-CSM MSs.

If the one or more retransmission packets are not present in the first buffer (in step 601), the scheduling procedure proceeds to step 605 which is described below. If the one or more retransmission packets are present in the first buffer (in step 601), the scheduling procedure proceeds to step 603. In step 603, the BS allocates the same resource amount and reapplies the same MCS level as previously applied to each of MSs that have transmitted the packets. That is, the BS sets the same condition as for the previous transmission so that each of the MSs retransmits the corresponding packet.

In step 605, the BS determines whether the one or more retransmission packets are present in the second buffer. That is, the BS determines whether MSs requiring retransmission are present among primary-CSM MSs.

If the one or more retransmission packets are not present in the second buffer (in step 605), the scheduling procedure proceeds to step 611 described below. If the one or more retransmission packets are present in the second buffer (in step 605), the scheduling procedure proceeds to step 607. In step 607, the BS couples MSs whose coupled secondary-CSM MSs have one or more packets stored in the third buffer among the primary-CSM MSs that have previously transmitted the one or more packets with the same condition. That is, if the one or more packets of two coupled MSs require retransmission, the BS couples the two coupled MSs using the same resource at the same MCS level as before.

In step 609, the BS allocates the same resource amount and reapplies the same MCS level as before to MSs whose coupled secondary-CSM MSs have no erroneous packets among the primary-CSM MSs that have previously transmitted the one or more packets. That is, the BS sets the same condition as the previous transmission so that the remaining non-coupled primary-CSM MSs retransmit the corresponding one or more packets.

In step 611, the BS determines whether one or more retransmission packets are present in the third buffer. That is, the BS determines whether MSs requiring retransmission are present among secondary-CSM MSs. Herein, the BS considers only the remaining MSs after the MSs are coupled in step 607.

If the retransmission packets are not present in the third buffer (in step 611), the scheduling procedure proceeds to step 615 described below. If the retransmission packets are present in the third buffer (in step 611), the scheduling procedure proceeds to step 613. In step 613, the BS allocates the same resource amount and reapplies the same MCS level as before to the secondary-CSM MSs that have transmitted the one or more packets. That is, the BS sets the same condition as for the previous transmission so that the secondary-CSM MSs retransmit the corresponding one or more packets.

Thereafter, in step 615, the BS determines whether the condition for the total system load ($L_{sys}$) is satisfied.

If the condition for the total system load ($L_{sys}$) is not satisfied (in step 615), the BS ends the scheduling procedure.

On the other hand, if the condition for the total system load ($L_{sys}$) is satisfied (in step 615), the scheduling procedure proceeds to step 617. In step 617, the BS determines whether non-scheduled resources are present.

If the non-scheduled resources are not present (in step 617), the scheduling procedure proceeds to step 621 described below. If the non-scheduled resources are present (in step 617), the BS performs general scheduling on the non-scheduled resources in step 619. That is, the BS allocates the non-scheduled resources to MSs without duplicate resource allocation.

In step 621, the BS performs CSM-based scheduling on the non-allocated resources and then ends the scheduling procedure. For example, the BS performs scheduling that satisfies the conditions for the total system load $L_{sys}$, the collaborative load $\hat{L}_{CSM(n,j)}(k)$ and the estimated power $\hat{P}_n(k)$ of the secondary-CSM MS. Herein, the non-allocated resources are the resources scheduled in steps 609, 613 and 619.

In an exemplary embodiment, steps 619 and 621 of FIG. 6 are identical to the scheduling procedure of FIG. 4. In another embodiment, steps 619 and 621 of FIG. 6 are identical to the scheduling procedure of FIG. 5.

Figure 7:
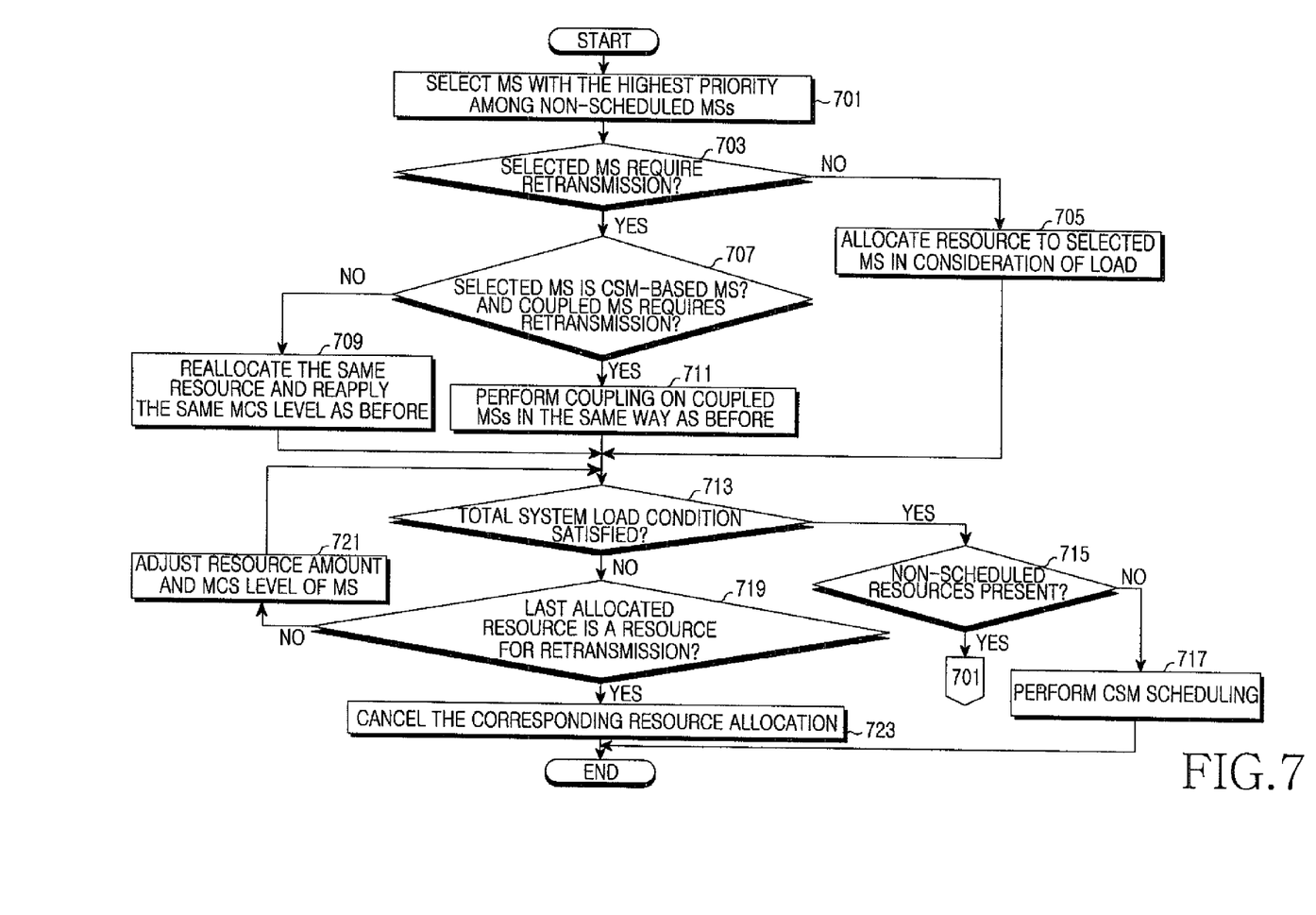
FIG. 7 is a flowchart of a scheduling procedure for a BS in a broadband wireless communication system according to a fourth exemplary embodiment the present invention.

FIG. 7 is a flowchart illustrating a scheduling procedure of the BS in the broadband wireless communication system according to a fourth exemplary embodiment the present invention. FIG. 7 illustrates a scheduling procedure when priorities are given regardless of the need of the retransmission.

Referring to FIG. 7, in step 701, the BS selects a MS with the highest priority among non-scheduled MSs.

In step 703, the BS determines whether the selected MS requires retransmission. That is, the BS determines whether at least one packet transmitted by the MS is stored in the first buffer, the second buffer, or the third buffer because it has an error.

If the selected MS does not require retransmission (in step 703), the scheduling procedure proceeds to step 705. In step 705, the BS allocates a resource to the selected MS in consideration of the load. Thereafter, the scheduling procedure proceeds to step 713 described below.

On the other hand, if the selected MS requires retransmission (in step 703), the scheduling procedure proceeds to step 707. In step 707, the BS determines whether the selected MS is a MS based on the CSM scheme. At this point, the selected MS may be any one of a primary-CSM MS and a secondary-CSM MS. In step 707, the BS also determines whether a MS coupled with the selected MS requires retransmission. That is, the BS determines whether the transmitted more or more packets of both of the selected MS and the coupled MS are stored in the first buffer, the second buffer, or the third buffer because they have an error.

If any one of the two conditions is not satisfied (in step 707), that is, if the selected MS is not based on the CSM scheme or if the coupled MS does not require retransmission, the scheduling procedure proceeds to step 709. In step 709, the BS allocates the same resource amount and reapplies the same MCS level to the selected MS as before. That is, the BS sets the same condition as for the previous transmission so that the selected MS retransmits the corresponding packet. Thereafter, the scheduling procedure proceeds to step 713 described below.

On the other hand, if both of the two conditions are satisfied (in step 707), that is, if the selected MS based on the CSM scheme and if the coupled MS also requires retransmission, the scheduling procedure proceeds to step 711. In step 711, the BS couples the selected MS in the same way as before. That is, if both of the packets of the two coupled MSs require retransmission, the BS couples the two coupled MSs using the same resource amount at the same MCS level as before.

Thereafter, in step 713, the BS determines whether the condition for the total system load ($L_{sys}$) is satisfied.

If the condition for the total system load ($L_{sys}$) is satisfied (in step 713), the scheduling procedure proceeds to step 715. In step 715, the BS determines whether non-scheduled resources are present. If the non-scheduled resources are present (in step 715), the BS returns to step 701 to perform scheduling on a new MS.

On the other hand, if the non-scheduled resources are not present (in step 715), the scheduling procedure proceeds to step 717. In step 717, the BS performs scheduling for the CSM scheme on the non-allocated resources. That is, the BS performs scheduling for the CSM scheme in the same way as in steps 403 to 421 of FIG. 4. Thereafter, the scheduling procedure ends.

On the other hand, if the condition for the total system load ($L_{sys}$) is not satisfied (in step 713), the scheduling procedure proceeds to step 719. In step 719, the BS determines whether the last allocated resource of steps 701 to 711 is a resource for retransmission.

If the last allocated resource is not a resource for retransmission (in step 719), i.e., if the last allocated resource is a resource for transmission of a new packet, the BS adjusts the resource amount and the MCS level of the corresponding MS in step 721 and returns to step 713.

On the other hand, if the last allocated resource is a resource for retransmission (in step 719), the BS withdraws the last allocated resource in step 723 and then ends the scheduling procedure.

The above description has been made with the case of coupling two MSs, to which the exemplary embodiments of the present invention are not limited. Thus, it is to be clearly understood that the exemplary embodiments of the present invention are equally applicable to a case of coupling three or more MSs.

As described above, exemplary embodiments of the present invention couple MSs with good channel conditions for the CSM scheduling in the broadband wireless communication system, thereby maximizing the resource use efficiency without increasing the load in the corresponding resource region.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. An apparatus for a base station in a wireless communication system supporting a collaborative spatial multiplexing (CSM) scheme, the apparatus comprising:
   a controller for selecting a second mobile station with the best channel quality among non-scheduled mobile stations to couple the selected second mobile station with a scheduled first mobile station;
   an estimator for estimating a load and transmitting (TX) power of the second mobile station; and
   a determiner for adjusting a modulation and coding scheme (MCS) level of the second mobile station so that a total load of the first and second mobile stations when coupled does not exceed a first threshold value and also the power of the second mobile station does not exceed a second threshold value.

2. The apparatus of claim 1, wherein the estimator estimates the load of each mobile station according to the following equation:

$$\text{reqCINR}(\text{MCS}(k)) + 10 \log 10(\text{Nsch}(k)) + \text{NI} - \text{CQI}(k)$$

where reqCINR(MCS(k)) denotes a required Signal-to-Interference and Noise Ratio (SINR) for an MCS level determined in the $k^{th}$ frame, Nsch(k) denotes the amount of resource allocated in the $k^{th}$ frame, NI denotes a noise and interference, and CQI(k) denotes the downlink channel quality fed back in the $k^{th}$ frame.

3. The apparatus of claim 1, wherein the estimator estimates the power of the mobile station according to the following equation:

$$P(k-i) - \text{reqCINR}(\text{MCS}(k-i)) + \text{reqCINR}(\text{MCS}(k)) - 10 \log 10(\text{Nsch}(k-i)) + 10 \log 10 \text{Nsch}(k)) - \text{NI}(k-i) + \text{NI}(k)$$

where P(k−i) denotes the TX power in the $(k-i)^{th}$, reqCINR(MCS(k)) denotes a required SINR for an MCS level in the $k^{th}$ frame, Nsch(k) denotes the amount of resource allocated in the $k^{th}$ frame, and NI(k) denotes a noise and interference in the $k^{th}$ frame.

4. The apparatus of claim 1, wherein the controller reduces the MCS level of the second mobile station by one level if the total load of the coupled mobile stations exceeds the first threshold value or if the power of the second mobile station exceeds the second threshold value.

5. The apparatus of claim 4, wherein the controller cancels the coupling of the first mobile station and the second mobile station if the MCS level of the second mobile station cannot be reduced by one level.

6. The apparatus of claim 1, wherein the controller detects the total system load and couples the first mobile station and the second mobile station if the detected total system load is smaller than or equal to a third threshold value.

7. The apparatus of claim 1, wherein before the selecting of the second mobile station, the controller selects a mobile station with the highest priority among non-scheduled mobile stations as the first mobile station.

8. The apparatus of claim 1, wherein before the selecting of the second mobile station, the controller performs scheduling without consideration of the CSM scheme and selects a mobile station with the lowest load among the scheduled mobile stations as the first mobile station.

9. The apparatus of claim 1, wherein if there is an error in all packets received from the coupled first and second mobile stations through the CSM scheme, the controller again couples the first mobile station and the second mobile station using the same resource as in the previous scheduling for packet retransmission according to a hybrid automatic repeat request (HARQ) scheme.

10. A method for scheduling by a base station in a wireless communication system supporting a collaborative spatial multiplexing (CSM) scheme, the method comprising:
    selecting a second mobile station with the best channel quality among non-scheduled mobile stations to couple the selected second mobile station with a scheduled first mobile station;
    estimating the load and transmitting (TX) power of the second mobile station; and
    adjusting a modulation and coding scheme (MCS) level of the second mobile station so that a total load of first and second mobile stations when coupled does not exceed a first threshold value and also the power of the second mobile station does not exceed a second threshold value.

11. The method of claim 10, wherein the load of each mobile station is estimated according to the following equation:

$$\text{reqCINR}(\text{MCS}(k)) + 10 \log 10(\text{Nsch}(k)) + \text{NI} - \text{CQI}(k)$$

where reqCINR(MCS(k)) denotes a required Signal-to-Interference and Noise Ratio (SINR) for an MCS level determined in the $k^{th}$ frame, Nsch(k) denotes the amount of resource allocated in the $k^{th}$ frame, NI denotes a noise and interference, and CQI(k) denotes the downlink channel quality fed back in the $k^{th}$ frame.

12. The method of claim 10, wherein the power of the mobile station is estimated according to the following equation:

$$P(k-i)-reqCINR(MCS(k-i))+reqCINR(MCS(k))-10 \log 10(Nsch(k-i))+10 \log 10(Nsch(k))-NI(k-i)+NI(k)$$

where $P(k-i)$ denotes the TX power in the $(k-i)^{th}$, $reqCINR(MCS(k))$ denotes a required SINR for an MCS level in the $k^{th}$ frame, $Nsch(k)$ denotes the amount of resource allocated in the $k^{th}$ frame, and $NI(k)$ denotes a noise and interference in the $k^{th}$ frame.

13. The method of claim 10, wherein the adjusting of the MCS level comprises:
reducing the MCS level of the second mobile station by one level if the total load of the coupled mobile stations exceeds the first threshold value or if the power of the second mobile station exceeds the second threshold value.

14. The method of claim 13, further comprising:
canceling the coupling of the first mobile station and the second mobile station if the MCS level of the second mobile station cannot be reduced by one level.

15. The method of claim 10, further comprising:
detecting the total system load and coupling the first mobile station and the second mobile station if the detected total system load is smaller than or equal to a third threshold value.

16. The method of claim 10, further comprising, before the selecting of the second mobile station:
selecting a mobile station with the highest priority among non-scheduled mobile stations as the first mobile station.

17. The method of claim 10, further comprising, before the selecting of the second mobile station:
performing scheduling without consideration of the CSM scheme and selecting a mobile station with the lowest load among the scheduled mobile stations as the first mobile station.

18. The method of claim 10, further comprising:
if there is an error in all packets received from the coupled first and second mobile stations through the CSM scheme, again coupling the first mobile station and the second mobile station using the same resource as in the previous scheduling for packet retransmission according to a hybrid automatic repeat request (HARQ) scheme.

* * * * *